INVENTORS
MAXIMILIEN FELIX REIJNST
WILHELMUS HENDRIKUS VAN DONSELAAR
BY
AGENT

United States Patent Office 3,072,813
Patented Jan. 8, 1963

3,072,813
ROTOR HAVING A PLURALITY OF PERMANENT MAGNETS ARRANGED ON THEIR PERIPHERY
Maximilien Felix Reijnst and Wilhelmus Hendrikus van Donselaar, Eindhoven, Netherlands, assignors to North American Philips Company Inc., New York, N.Y., a corporation of Delaware
Filed Sept. 29, 1958, Ser. No. 764,147
Claims priority, application Netherlands Oct. 22, 1957
5 Claims. (Cl. 310—156)

This invention relates to rotors having a plurality of permanent magnets arranged on their periphery.

According to the invention, the magnets consist of a material having an $H_c$ higher than 1000 oersted whereas their poles of equal polarity are adjacent one another and the magnets separated by pole plates are located in juxtaposition in the tangential direction and held in the radial direction by the direct support of, and/or attachment to the pole plates, which on the inner side are secured to a ring of non-magnetic material arranged on the shaft of the rotor.

This application is a continuation-in-part of application Serial No. 690,009, filed October 14, 1957, now U.S. Patent 2,907,903.

By the particular choice of the magnetic material and the location of the magnetic poles with respect to one another, it is possible to build up a rotor having a large number of alternating poles without a large pitch of the poles being necessarily involved. Due to their large number, it is then not readily possible for the magnets to be secured themselves directly to the shaft, for example by means of a screwed connection or an adhesive. Furthermore, the forces resulting from the centrifugal action may be such that the magnets are required to be secured very rigidly. It would be possible for the magnets to be secured to a cylindrical supporting body surrounding the rotor and secured to the shaft. However, the air-gap between the rotor and a surrounding part, which co-acts with it, is thus increased to an undesirable extent, so that the advantages obtained with the structure according to the invention would partly be lost again. Another solution could be by providing the pole plates with cams which project from the magnets on the sides of the rotor and which are surrounded by an annular body secured to the shaft. However, the surface pressures which occur in this construction may become such that the material of which the pole plates are built up cannot withstand such pressures. Furthermore, as a result of the centrifugal forces occurring, the pole plates in this structure are subject to bending stress, so that the strength of the pole plates must in certain cases be greater than is desirable in magnetic respect. By holding the magnets in the radial direction by the direct support of, and/or attachment to the pole plates, which pole plates are secured on their inner side to a ring of nonmagnetic material arranged on the shaft of the rotor, it is achieved in a simple manner, that the magnets are secured to the shaft by means of the pole plates already present. This requires only the use of a ring of non-magnetic material arranged on the shaft of the rotor, so that a very simple and compact structure is obtained which is readily accessible. The ring of non-magnetic material may be arranged on the shaft of the rotor by means of stakes or a thin plate-like disc, so that the shaft of the rotor may be journalled directly on each side of the stakes or the disc. The flexure of the shaft may thus be minimized, which is desirable in view of proper centering of the rotor with respect to the stator surrounding it. It is thus possible to obtain a very narrow air-gap between the rotor and the stator without the risk being involved that the rotor and the stator may come in contact with each other.

In the structure according to the invention, the ring of non-magnetic material is the structure which absorbs the centrifugal forces. In connection therewith, the strength of the ring is to be chosen dependent upon the speed of rotation of the rotor.

It has been found possible to give the ring of non-magnetic material a width smaller than that of the pole plates. The thickness of the ring must then be chosen correspondingly, the pole plates themselves usually being strong enough to avoid any troublesome deformation during operation.

The width of the ring of non-magnetic material is preferably about ⅓ of the width of the pole plates.

In order to give the ring of non-magnetic material a sufficiently high tensile strength, it is preferably made of chrome-nickel steel.

Optimum results in magnetic respect are obtained if the cross-section of the magnets at right angles to the shaft of the rotor is rectangular and that of the portion of the pole plates located between the magnets is substantially in a trapezoidal shape. The thickness of the pole plates together thus increases with the increasing magnetic flux.

In order that the invention may be readily carried into effect, one embodiment will now be described in detail, by way of example, with reference to the accompanying drawing, in which.

Figure 1:
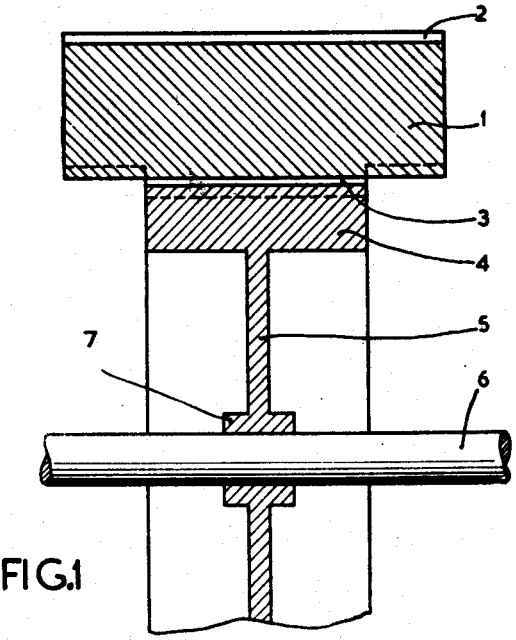
FIG. 1 is a cross-sectional view of the shaft of the rotor according to the invention.

The figures show a rotor provided on its periphery with a plurality of permanent magnets 1 each consisting of a material having an $H_c$ greater than 1000 oersted. Pole plates 2 are located between the magnets 1, which are magnetized in the tangential direction and have their poles of equal polarity adjacent one another so that alternately north and south poles are formed by the pole plates 2 on the periphery of the rotor. The pole plates 2 are secured on their inner side 3 to a ring 4 of chrome-nickel steel. The width of the ring 4 is approximately ⅓ of the width of the pole plates 2. The ring 4 is secured by means of a plate 5 which may be of the same material as the ring 4 via a nave 7 to the shaft 6 of the rotor.

Figure 2:
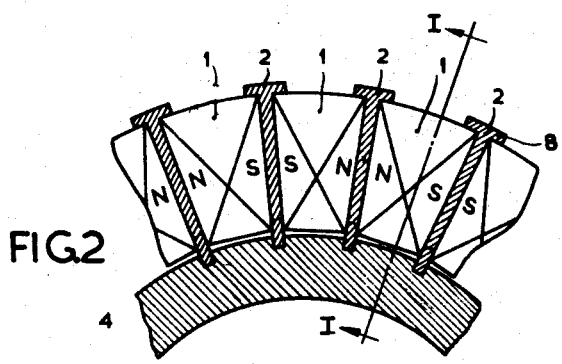
FIG. 2 is a cross-sectional view at right angles to the shaft of the rotor according to the invention.

In FIG. 2 the permanent magnets 1 have trapezoidal cross-section, the thickness of the portion of the pole plates 2 located between the magnets 1 being the same throughout.

Figure 3:
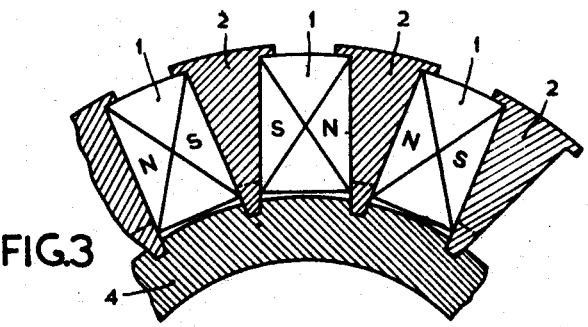
FIG. 3 shows a variant of the embodiment of FIG. 2.

In FIG. 3, the magnets 1 have a rectangular cross-section the thickness of the portion of the pole plates 2 located between the magnets 1 increasing towards the exterior.

The magnets 1 are held in radial direction by means of a widened part 8 of each pole plate 2. Besides, the magnets 1 are attached to the pole plates 2 with the aid of an adhesive.

What is claimed is:

1. A rotor comprising a shaft, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, pole plates disposed between and separating adjacent magnets, said magnets being secured to the pole plates, an annular member of non-magnetic material to which said pole plates are secured, and a plurality of radially-extending members of non-magnetic material each secured at one end to said annular member and secured at the other end to said shaft whereby said magnets are securely positioned about the periphery of said shaft.

2. A rotor comprising a shaft, a plurality of permanent magnets radially disposed about said shaft, each of said magnets being constiuted of a material having a coercive force ($H_c$) greater than about 1000 oersted, said magnets being disposed side-by-side in a tangential direction with poles of like polarity adjacent one another, pole plates disposed between and separating adjacent magnets, said magnets being secured to the pole plates, an annular member of non-magnetic material having a width approximately one-third that of the pole plates to which the latter are secured, and a plurality of radially-extending members of non-magnetic material each secured at one end to said annular member and secured at the other end to said shaft whereby said magnets are securely positioned about the periphery of said shaft.

3. A rotor comprising a shaft, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, pole plates disposed between and separating adjacent magnets, said magnets being secured to the pole plates, an annular chrome-nickel steel member to which the pole plates are secured, and a plurality of radially-extending members of non-magnetic material each secured at one end to said annular member and secured at the other end to said shaft whereby said magnets are securely positioned about the periphery of said shaft.

4. A rotor comprising a shaft, a plurality of permanent magnets radially disposed about said shaft, each of said magnets having a substantially rectangular cross-section at right angles to the axis of the shaft and being constituted of a material having a coercive force ($H_c$) greater than about 1000 oersted, said magnets being disposed side-by-side in a tangential direction with poles of like polarity adjacent one another, trapezoidal shaped pole plates disposed between and separating adjacent magnets, said magnets being secured to the pole plates an annular member of non-magnetic material to which said pole plates are secured, and a plurality of radially-extending members of non-magnetic material each secured at one end to said annular member and secured at the other end to said shaft whereby said magnets are securely positioned about the periphery of said shaft.

5. A rotor comprising a shaft, a plurality of permanent magnets radially disposed about said shaft, each of said magnets having a substantially rectangular cross-section at right angles to the axis of the shaft and being constituted of a material having a coercive force ($H_c$) greater than about 1000 oersted, said magnets being disposed side-by-side in a tangential direction with poles of like polarity adjacent one another, trapezoidal shaped pole plates disposed between and separating adjacent magnets, said magnets being secured to the pole plates, an annular chrome-nickel steel member having a width approximately one-third that of the pole plates to which the latter are secured, and a plurality of radially-extending members of non-magnetic material each secured at one end to said annular member and secured at the other end to said shaft whereby said magnets are securely positioned about the periphery of said shaft.

References Cited in the file of this patent

UNITED STATES PATENTS

| | | |
|---|---|---|
| 1,393,395 | Pletscher | Oct. 11, 1921 |
| 2,604,499 | Buckley | July 22, 1952 |
| 2,719,931 | Kober | Oct. 4, 1955 |
| 2,767,368 | Kober | Oct. 16, 1956 |
| 2,861,205 | Kober | Nov. 18, 1958 |

FOREIGN PATENTS

| | | |
|---|---|---|
| 668,436 | Germany | Dec. 3, 1938 |